United States Patent Office 3,285,938
Patented Nov. 15, 1966

3,285,938
TETRAGLYCIDYL ETHERS OF TRIS(HYDROXY-BENZYL) PHENOL
Ralph F. Sellers, Middlebush, N.J., assignor to Union Carbide Corporation, a corporation of New York
No Drawing. Filed Oct. 10, 1961, Ser. No. 144,020
3 Claims. (Cl. 260—348)

This invention relates to curable tetraglycidyl ethers, produced on reacting an epihalohydrin with tris(hydroxybenzyl)phenol, and cured products obtained therefrom. More particularly, this invention relates to curable tetraglycidyl ethers of tris(hydroxybenzyl)phenol which are especially useful as laminating varnishes for bonding layers of mineral fiber cloth into a unitary structure, and as protective coatings on wood, metal and other like structures.

The tetraglycidyl ethers of this invention are the tetraglycidyl ethers of tris(hydroxybenzyl)phenol of the formula:

Formula I

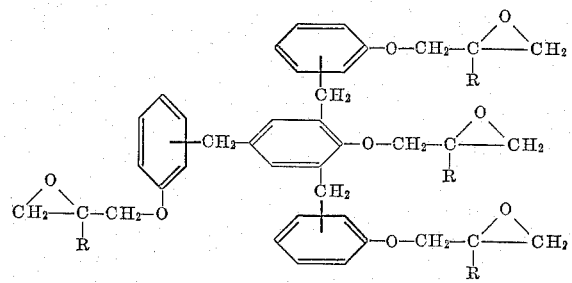

wherein R is either a hydrogen atom or a methyl group and each methylene group is attached to the phenylglycidyl ether radical in a position other than meta to the glycidyl ether group of the phenylglycidyl ether radical.

The tris(hydroxybenzyl)phenol which is reacted with an epihalohydrin to produce the tetraglycidyl ethers of this invention is a phenol of the formula:

Formula II

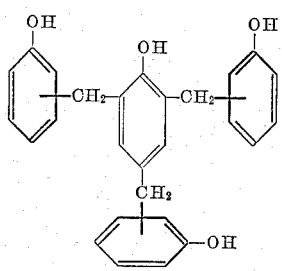

wherein each methylene group is attached to the hydroxyphenyl radical in a position other than meta to the hydroxy group.

The tris(hydroxybenzyl)phenol is prepared by condensing one mole of trimethylolphenol and three moles of phenol. Preparation of the trimethylolphenol is described in U.S. Patent 2,889,374 to C. Y. Meyers issued June 2, 1959, and U.S. Patent 2,971,987 issued February 14, 1961. Salts of trimethylolphenol such as those described in U.S. Patent 2,579,329 to R. W. Martin issued December 18, 1951, and U.S. Patent 2,889,373 to C. Y. Meyers issued June 2, 1959, may also be used.

Exemplary of suitable epihalohydrins that can be reacted with the tris(hydroxybenzyl)phenol to produce the tetraglycidyl ethers of this invention can be noted epihalohydrins of the formula:

Formula III

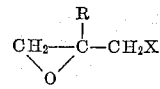

wherein R is either a hydrogen or a methyl radical and X is a halogen, e.g., chlorine or bromine.

In conducting the reaction between an epihalohydrin and tris(hydroxybenzyl)phenol, various amounts of the reactants can be employed. Generally, the amount of an epihalohydrin employed will be at least 1 mole per each OH equivalent of the tris(hydroxybenzyl)phenol, and preferably from about 3 to about 4 moles of epihalohydrin per OH equivalent. More than about 4 moles of an epihalohydrin per OH equivalent can be used, but this results in little improvement in the yield of tetraglycidyl ether.

The reaction between an epihalohydrin and tris(hydroxybenzyl)phenol is usually carried out utilizing a catalyst which provides an alkaline reaction medium for the reaction. As a rule the catalysts used serve a dual purpose. Initially, they serve to catalyze the reaction of an epihalohydrin with the tris(hydroxybenzyl)phenol to form the corresponding halohydrin ether and subsequently they serve to dehydrohalogenate the chyorohydrin ether to the corresponding tetraglycidyl ether.

For a detailed discussion of suitable procedures to be used in conducting the reaction between an epihalohydrin and tris(hydroxybenzyl)phenol, including a discussion of suitable catalysts, suitable reaction temperatures and the like reference is made to U.S. Patent 2,943,095 to A.G. Farnham et al. which is incorporated herein by reference.

As previously stated, the tetraglycidyl ethers of this invention have particular utility for use as laminating varnishes. When the tetraglycidyl ethers are to be used as laminating varnishes, they are dissolved in solvents which are inert and non-deleterious thereto such as acetone, methyl ethyl ketone and the like and a suitable curing agent added thereto. Generally, these laminating varnishes have a solids content, based upon the weight of the tetraglycidyl ether, of about 60 to about 70 percent by weight.

Fabrics, such as glass or asbestos fiber fabrics, which are to be laminated, are then impregnated with the laminating varnish. Upon heating the impregnated material, the solvent is driven off. Layers of the impregnated material are then stacked one on another and subjected to heat and pressure. On applying pressure and more heat, the composition cures to an infusible product bonding together the fabic layers into a unitary structure. The actual pressures and temperatures employed will, of course, vary and depend in part upon the exact composition used.

Curing agents are generally classified as hardeners, that is curing agents which themselves react with the tetraglycidyl ethers or are classified as catalysts, that is curing agents which promote the self-reaction of the tetraglycidyl ethers.

When used, the hardener is present in amounts of from about 75 percent of stoichiometric to about 15 percent in excess of stoichiometric and preferably from about 90 percent of stoichiometric to about 10 percent in excess of stoichiometric.

In those instances wherein the curing agent used is a catalyst, the catalyst is used in amounts of from about 0.2 to 5 percent by weight, preferably from about 0.5 to about 2 percent by weight, based on the weight of the tetraglycidyl ether. More than about 5 percent by weight of catalyst can be used but this does not materially decrease the time of the curing cycle of the compositions and is therefore economically undesirable.

Illustrative of suitable hardening agents are those compounds containing replaceable hydrogen atoms, as for example the polyamines of the formula:

Formula IV

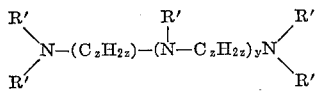

wherein $y$ is an integer from zero to 3 inclusive, $z$ is an integer from 2 to 6 inclusive, R' in each instance is a monovalent substituent being either hydrogen or a hydroxyalkyl group wherein the alkyl group preferably contains from 1 to 4 carbon atoms inclusive, as for example, hydroxyethyl and hydroxypropyl, the hydroxyalkyl groups in any molecule not necessarily being the same, and the number of instances per molecule where R' represents a hydroxyalkyl group being a whole number which is at least one, but less than $y+2$.

Typical hydroxyalkyl alkylene polyamines coming within the scope of the above structural formula are the following: N - hydroxyethyl ethylenediamine, N - hydroxyethyl pentamethylenediamine, N - hydroxypropyl tetramethylenediamine, N - hydroxyethyl diethylenetriamine, N,N - dihydroxyethyl diethylenetriamine, N,N''-dihydroxyethyl diethylenetriamine, N - hydroxypropyl diethylenetrimine, N,N - dihydroxypropyl diethylenetriamine, N,N'' - dihydroxypropyl diethylenetriamine, N-hydroxyethyl propylenediamine, N - hydroxypropyl propylenediamine, N - hydroxyethyl dipropylenetriamine, N,N - dihydroxyethyl dipropylenetriamine, N,N' - dihydroxyethyl dipropylenetriamine, tris - hydroxyethyl triethylenetetramine and the like.

Preparation of hydroxyalkyl alkylene polyamines is described in U.S. Patent 2,901,461 to V. Auerbach et al. issued August 25, 1959.

Other suitable polyamine hardeners include, among others, the adducts formed on reacting at temperatures of about 0° C. to about 150° C. a polyamine having Formula IV, previously noted or a polyamine of the formula:

Formula V

wherein $m$ has a value of from 2 to 10 inclusive, preferably from 2 to 6 inclusive and $p$ has a value of from 1 to 6 inclusive, preferably 1 to 4 inclusive, with at least about 0.5 mole and preferably from about 0.5 to about 2.0 moles, per mole of amine, of an acrylate of the formula:

Formula VI

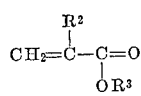

wherein $R^3$ is an alkyl radical, preferably containing from 1 to 18 carbon atoms inclusive; $R^2$ is either hydrogen or an alkyl radical containing from 1 to 2 carbon atoms inclusive.

Among suitable polyamines falling within the scope of Formula V are: 1,2-diaminoethane, 1,3-diaminopropane, 1,4 - diaminobutane, 1,5 - diaminopentane 1,6 - diaminohexane 1,8 - diaminooctane, 1,9 - diaminononane, 1,10 - diaminodecane, diethylenetriamine, triethylenetetramine, tetraethylenepentamine, dipropylenetriamine and the like. Illustrative of acrylates coming within the purview of Formula VI which can be reacted with the polyamines to produce the amine-acrylate adducts are the following: methylacrylate, ethylacrylate, n-propylacrylate, isopropylacrylate, n-butylacrylate, n-amylacrylate, n-hexylacrylate, 2-ethylhexylacrylate, n-octylacrylate, n-nonylacrylate, n-laurylacrylate, n-pentadecylacrylate, n-octadecylacrylate, methylmethacrylate, methylethacrylate, isopropylmethacrylate, n-hexylmethacrylate, n-nonylmethacrylate, ethylacrylate, n-butylethacrylate, n-amylethacrylate, n-hexylethacrylate, 2-ethylhexylethacrylate, n-octadecylethacrylate and the like.

In addition to the amines noted, other suitable amine hardening agents are: 2-aminoethanol, 2-aminopropanol, 3 - aminobutanol, 1,3 - diamino - 2 - propanol, m - aminophenol, p - aminophenol, 4,4' - methylene dianiline, m-phenylene diamine, diethylenetriamine and the like.

For purposes of stoichiometric calculations with respect to amines, one aminohydrogen atom is deemed to react with one epoxy group; as to amino phenols, stoichiometry is based on replaceable hydrogen atoms, that is aminohydrogens and hydrogens of the hydroxyl groups.

Exemplary of other suitable hardening agents are the polyhydric phenols such as catechol, hydroquinone, hydroxyhydroquinone, chloroglucinol, resorcinol and pyrogallol; the di- or poly-nuclear phenols such as the bisphenols described in Bender et al., U.S. Patent 2,506,486 and polyphenylols such as novolak condensates of a phenol and a saturated or unsaturated aldehyde containing an average of from 3 to 20 or more phenylol groups per molecule (cf. book by T. S. Carswell entitled "Phenoplasts," published in 1947 by Interscience Publishers of New York). Examples of suitable polyphenylols derived from a phenol and an unsaturated aldehyde such as acrolein, are the triphenylols, pentaphenylols and heptaphenylols described in U.S. Patent 2,885,385 to A. G. Farnham, issued May 5, 1959.

The phenols may contain alkyl or aryl ring substituents or halogens, as exemplified by the alkyl resorcinols, the tribromo resorcinol and the diphenols containing alkyl and halogen substituents on the aromatic ring (Bender et al., U.S. Patent 2,506,486).

The polyhydric polynuclear phenols can consist of 2 or more phenols connected by such groups as methylene, alkylene, ether, ketone or sulfone. The connecting groups are further exemplified by the following compounds: bis-(p - hydroxyphenyl) - ether, bis(p - hydroxyphenyl) - ketone, bis(p - hydroxyphenyl) - methane, bis(p - hydroxyphenyl) - dimethyl methan, bis(p - hydroxyphenyl) - sulfone and the like.

For purposes of soichiometric calculations with respect to phenols, one hydroxyl group is deemed to react with one epoxy group.

In addition to the hardening agents previously listed, polycarboxylic acids and anhydrides thereof can also be employed. Among suitable polycarboxylic acids are those of the formula:

Formula VII $$HOOC-(CH_2)_f-COOH$$

wherein $f$ is an integer generally having a value of from 1 to 20 inclusive, as for example, malonic, succinic, glutaric, adipic, pimelic, suberic, azelaic, sebacic and the like. Other examples of suitable acids are phthalic acid, isophthalic acid, terephthalic acid and the like as well as the anhydrides of the acids noted above. Further acids which can be used as hardening agents are enumerated in U.S. Patent 2,918,444 to B. Phillips et al., issued December 22, 1959.

For purposes of stoichiometric calculations with respect to acids and anhydrides thereof, one carbonyl group is deemed to react with one epoxy group.

As previously stated, in those instance wherein catalysts are used, they are generally employed in amounts of from about 0.2 to about 5 percent by weight based on the weight of the tetraglycidyl ether. As examples of suitable catalysts are the metal halides exemplified by boron trifluoride, stannic chloride, zinc chloride, ferric chloride and the like as well as the etherates and amine complexes of such metal halides.

The following examples further illustrate this invention; in addition to these examples, it is apparent that

Example 1

(a) Preparation of a tris(hydroxybenzyl)phenol which is a product made up of a mixture of compounds of the formula:

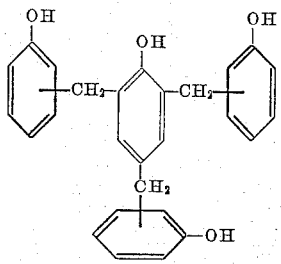

wherein each —CH$_2$— group is attached to the hydroxyphenyl radical in a position which is either ortho or para to the hydroxy group.

Two thousand eight hundred and twenty grams (30 moles) of phenol were acidified with a solution of 15.5 grams of oxalic acid dissolved in 31 grams of hot water. Eight hundred grams of aqueous (70%) trimethylolphenol were added to the mixture over a period of 20 minutes during which time the temperature of the mixture was held at 60–65° C. The water of reaction was distilled off at a temperature of 150° C. and at atmospheric pressure and then the excess phenol was distilled off at a temperature of 165° C. and under a vacuum at a pressure of 1.7 inches of mercury, leaving a molten residue. The molten residue, 1,320 grams, was poured into a pan and cooled to room temperature, about 23° C., and a brittle resinous product was obtained.

(b) Preparation of a tetraglycidyl ether by the reaction of the hydroxybenzylated phenol of (a) and epichlorohydrin, this tetraglycidyl ether is a product made up of a mixture of compounds of the formula:

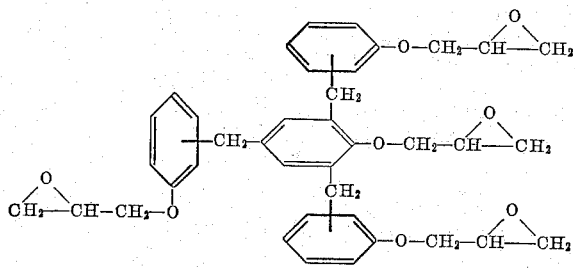

wherein each —CH$_2$— group is attached to the phenylglycidyl ether radical in a position ortho or para to the glycidyl ether group.

One thousand and forty grams of the tris(hydroxybenzyl)phenol prepared in (a) were dissolved in 2,775 grams of epichlorohydrin and 700 grams of ethyl alcohol. The reaction temperature was held at 55–65° C. while portions of (50%) sodium hydroxide were added as follows:

82 grams of (50%) sodium hydroxide in 60 minutes
82 grams of (50%) sodium hydroxide in 30 minutes
574 grams of (50%) sodium hydroxide in 60 minutes
82 grams of (50%) sodium hydroxide in 60 minutes The mixture was stirred for an additional 20 minutes at about 55° C. and then distilled at atmospheric pressure to a temperature of 115° C. in 1 hour and 40 minutes. The organic portion of the residue was dissolved in 3,000 ml. of methylethyl ketone and the solution was filtered to remove any salts. One thousand ml. of methylethyl ketone were added to the salt cake obtained in the above filtration and then this mixture was filtered. The combined filtrates from the above filtrations were distilled under atmospheric pressure to a temperature of 160° C. in 2½ hours. The residue was subjected to vacuum steam distillation at 160° C. for 4 hours leaving the tetraglycidyl ether. The tetraglycidyl ether was dried at a temperature of 160° C. and under a pressure of 2.2 inches of mercury for 10 minutes leaving a soft solid having an epoxy equivalency of 190.8 grams/gram mole epoxy.

(c) Use of the tetraglycidyl ether of (b) as a laminating varnish.

Woven glass cloth was saturated with a solution containing 540 grams of the tetraglycidyl ether of (b), 0.7% on solids of boron trifluoride monoethylamine complex and 360 grams of methylethyl ketone and then dried for 10 minutes at 144° C. The fabric had a resin content of 31–33% by weight. Twelve layers of impregnated fabric were pressed into flat panels 14 inches by 14 inches. The panels were prepared by stacking layers of impregnated fabric one on another and subjecting the layers so stacked to a pressure of 300 p.s.i.g., between platens which were at 163° C., for a period of 60 minutes. Each panel was then heated as follows:

163° C. for 12 hours
177° C. for 1 hour
191° C. for 1 hrour
204° C. for 6 hours

The panels so prepared were found to have the following properties:

|  | 23° C. | 149° C. | 204° C. | 260° C. |
|---|---|---|---|---|
| Flexural Strength (p.s.i.) | 95,500 | 36,100 | 21,000 | 19,500 |
| Flexural modulus (p.s.i.) | 4.69×10$^6$ | 3.70×10$^6$ | 6.39×10$^6$ | 3.30×10$^6$ |
| Tensile strength (p.s.i.) | 65,900 | | | |
| Tensile modulus (p.s.i.) | 3.32×10$^6$ | | | |
| Compressive strength (p.s.i.) | 64,800 | | | |
| Compressive modulus (p.s.i.) | 5.05×10$^6$ | | | |

Tests noted in this and in subsequent examples were conducted according to the procedures noted below:

Flexural strength _____ ASTMD D790–58T
Flexural modulus _____ ASTMD D790–58T
Tensile strength _____ ASTMD D638–58T
Tensile modulus _____ ASTMD D638–58T
Compressive strength _____ ASTMD D695–52T
Compressive modulus _____ ASTMD D695–52T

Example 2

(a) Preparation of a tris(hydroxybenzyl)phenol made up of a mixture of compounds of the formula:

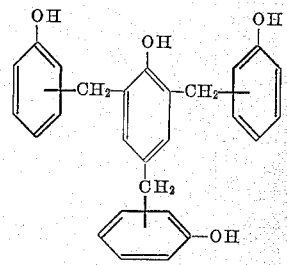

wherein each —CH$_2$— group is attached to the hydroxyphenyl radical in a position which is either ortho or para to the hydroxy group.

Five thousand eight hundred grams of aqueous trimethylolphonol, 20,475 grams of phenol and 164 grams of oxalic acid were dissolved in 1,490 grams of water. The pH of the resultant solution was measured to be 0.9. The solution was heated to atmospheric reflux (104° C.) in 35 minutes and then refluxed for 60 minutes. The solution was then distilled to 150° C. at atmospheric pressure and then vacuum distilled under a pressure of 2.2 inches of mercury to 170° C. leaving a molten product. This hydroxybenzylated phenol was discharged into a pan and upon cooling to room temperature, about 23° C., became a brittle, tacky solid.

(b) Preparation of a tetraglycidyl ether by the reaction of the hydroxybenzylated phenol of (a) and epichlorohydrin, this tetraglycidyl ether is a product made up of a mixture of compounds of the formula:

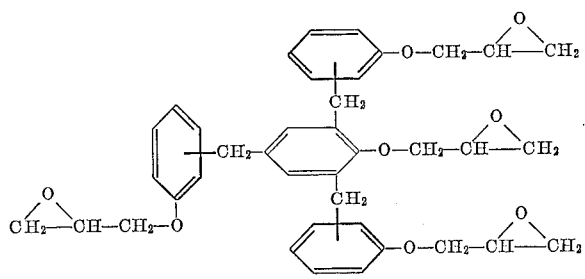

wherein each —CH$_2$— group is attached to the phenyl-glycidyl ether radical in a position ortho or para to the glycidyl ether group.

Six thousand eight hundred and ten grams of the tris-(hydroxybenbzyl)phenol prepared in (a) were dissolved in 4585 grams of ethyl alcohol and 18,115 grams of epichlorohydrin by heating the mixture to reflux at 82° C. for 2 hours. The reaction temperature was then held at 60–65° C., while portions of (50%) sodium hydroxide were added as follows:

554 grams of (50%) sodium hydroxide in 60 minutes
554 grams of (50)% sodium hydroxide in 30 minutes
3,878 grams of (50%) sodium hydroxide in 60 minutes
554 grams of (50%) sodium hydroxide in 60 minutes The mixture was stirred for an additional 20 minutes at about 60° C. and then distilled at atmospheric pressure to a temperature of 135° C. in 75 minutes. The organic portion of the residue was dissolved in 13,000 ml. of methyl isobutyl ketone and then 7757 grams of water were added to dissolve any salts present. The solution then contained an organic layer and a brine layer and after the solution was allowed to settle for 20 minutes, the brine layer was drained off the bottom. The remaining organic layer was dried by distilling the solution to a pot temperature of 125° C. The residue obtained was dissolved in 6,780 ml. of methyl isobutyl ketone and the solution was filtered. The filtrate obtained was distilled to 150° C. at atmospheric pressure and then subjected to a vacuum distillation to 160° C. under a pressure of 2.2 inches of mercury. The residue was then vacuum steam distilled at 160° C. for 90 minutes and dried at 160° C. under a pressure of 2.2 inches of mercury for 20 minutes. The residue obtained was a soft solid at room temperature, about 23° C. and found to have the following properties:

Epoxy equivalency, grams/gram mole epoxy _____ 183.9
Hydrolyzable chlorine, percent _____ 0.51
Ash, percent _____ 0.11
Viscosity (40% solution butyl Carbitol solvent),
  centistokes _____ 57.9

(c) Use of tetraglycidyl ether of (b) as a laminating varnish.

Woven glass cloth was saturated with a solution containing 2,925 grams of the tetraglycidyl ether of (b), 2.4% based upon solids present of boron trifluoride·monoethylamine complex and 1,575 grams of methylethyl ketone and then dried for 2.4 minutes at 150° C. The fabric had a resin content of 40% by weight. Twelve layers of impregnated fabric were pressed into flat panels 14 inches by 14 inches. The panels were prepared by stacking layers of impregnated fabric one on another and subjecting the layers so stacked to a pressure of 500 p.s.i.g., between platens which were at 163° C., for a period of 60 minutes. Each panel was then cured at 205° C. for 6 hours.

The panels so prepared were found to have the following properties:

|  | 23° C. | 260° C. | 192 Hours at 260° C. |
|---|---|---|---|
| Flexural strength (p.s.i.) | 61,900 | 19,500 | 4,800 |
| Flexural modulus (p.s.i.) | 3.08×10 | 2.35×10 | 1.19×10 |
| Tensile strength (p.s.i.) | 35,600 | | |
| Tensile modulus (p.s.i.) | 2.57×10⁶ | | |
| Compressive strength (p.s.i.) | 35,900 | | |
| Compressive modulus (p.s.i.) | 3.39×1.⁶ | | |

In order to further show the excellent heat resistivity of the tetraglycidyl ethers of this invention, the preparation of a laminate was conducted according to the procedure described in 1 (c) with the exception that the diglycidylether of 2,2-bis-(p-hydroxyphenyl)-propane having an epoxy equivalency of 192 grams/gram mole epoxy was used in lieu of the tetraglycidyl ether and a stochiometric amount of 4,4'-methylene dianiline was used in lieu of the boron trifluoride·monoethylamine complex. Laminates so produced had the following properties:

Flexural strength (p.s.i.)
  at 204° C. _____ 10,600.
Flexural strength (p.s.i.)
  at 204° C. _____ 1.2×10⁶.
Flexural modulus (p.s.i.)
  at 260° C. _____ Too poor to obtain any data.
Flexural modulus (p.s.i.)
  at 260° C. _____ Too poor to obtain any data.

In addition to being excellently suited for use as laminating varnishes, the polyglycidyl ethers of this invention, upon the addition thereto of suitable curing agents, can be molded or otherwise shaped into articles which are characterized by excellent heat resistivity.

It is understood that all patents and literature references noted in this application are incorporated herein by reference.

What is claimed is:

1. A tetraglycidyl ether of the formula:

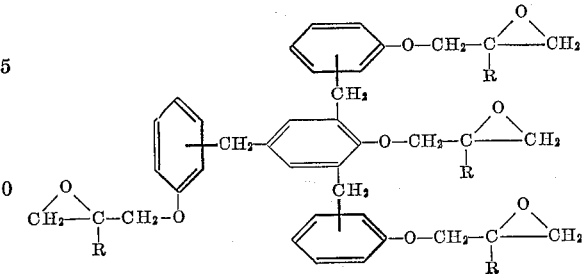

wherein R is a member selected from the group consisting of hydrogen atoms and methyl radicals and with the limitation that each methylene radical is attached to the phenyl radical in a position other than meta to the glycidyl ether radical.

2. A tetraglycidyl ether as defined in claim 1 wherein each R is a hydrogen atom.

3. A tetraglycidyl ether as defined in claim 1 wherein each R is a methyl radical.

(References on following page)

References Cited by the Examiner

UNITED STATES PATENTS

| | | | |
|---|---|---|---|
| 2,801,989 | 8/1957 | Farnham | 260—47 |
| 2,965,611 | 12/1960 | Schwarzer | 260—47 |
| 3,053,803 | 9/1962 | Jaffe et al. | 260—619 |
| 3,092,610 | 6/1963 | Schwarzer | 260—47 |

OTHER REFERENCES

Freeman, J.A.C.S., vol. 74, pp. 6257–60 (1952).

WILLIAM H. SHORT, *Primary Examiner.*

HAROLD BURSTEIN, *Examiner.*

P. H. HELLER, T. D. KERWIN, *Assistant Examiners.*

UNITED STATES PATENT OFFICE
CERTIFICATE OF CORRECTION

Patent No. 3,285,938                         November 15, 1966

Ralph F. Sellers

It is hereby certified that error appears in the above numbered patent requiring correction and that the said Letters Patent should read as corrected below.

Column 2, lines 28 and 29, for "chyorohydrin" read -- chlorohydrin --; column 3, line 28, for "diethylenetrimine" read -- diethylenetriamine --; column 4, line 41, for "methan" read -- methane --; line 43, for "soichiometric" read -- stoichiometric --; line 66, for "instance" read -- instances --; column 6, lines 70 and 71, for "trimethylolphonol" read -- trimethylolphenol --; column 7, line 30, for "hydroxybenbzyl" read -- hydroxybenzyl --; column 8, line 16, for "$3.08 \times 10$, $2.35 \times 10$ and $1.19 \times 10$" read -- $3.08 \times 10^6$, $2.35 \times 10^6$ and $1.19 \times 10^6$ --; column 8, line 34, for "strength" read -- modulus --; line 36, for "modulus" read -- strength --.

Signed and sealed this 12th day of September 1967.

(SEAL)
Attest:

ERNEST W. SWIDER                        EDWARD J. BRENNER
Attesting Officer                     Commissioner of Patents